(12) United States Patent
Fader et al.

(10) Patent No.: US 6,425,594 B1
(45) Date of Patent: Jul. 30, 2002

(54) TORSION BAR WITH MULTIPLE ARM ADJUSTERS FOR A VEHICLE SUSPENSION SYSTEM

(75) Inventors: Joe Fader, Brighton; Mark Clements, Lapeer; Chris Keeney; Steve Yollick, both of Troy, all of MI (US); Jim Hawkins, Madison, AL (US)

(73) Assignee: Meritor Light Vehicle Technology, LLC, Troy, MI (US)

( * ) Notice: Subject to any disclaimer, the term of this patent is extended or adjusted under 35 U.S.C. 154(b) by 0 days.

(21) Appl. No.: 09/578,225

(22) Filed: May 24, 2000

(51) Int. Cl.$^7$ .............................. B60G 7/00; B60G 11/18
(52) U.S. Cl. ...................... 280/124.137; 280/124.166; 267/277
(58) Field of Search .................. 280/124.137, 124.167, 280/124.166, 124.13; 267/273, 274, 277, 278

(56) References Cited

U.S. PATENT DOCUMENTS

| | | | |
|---|---|---|---|
| 3,706,481 A | * 12/1972 | Kramer ............... | 280/124.137 |
| 4,635,958 A | * 1/1987 | Yonemoto .......... | 280/124.13 X |
| 4,641,856 A | * 2/1987 | Reichenbach ...... | 280/124.13 X |
| 5,178,406 A | * 1/1993 | Reynolds ............ | 80/124.13 X |
| 5,186,216 A | * 2/1993 | Bollier ................ | 267/277 X |
| 5,244,190 A | * 9/1993 | Bianchi .............. | 267/277 X |
| 5,255,936 A | * 10/1993 | Velazquez .......... | 280/124.13 |
| 5,354,041 A | * 10/1994 | Edwards ............ | 267/277 |
| 5,538,229 A | * 7/1996 | Kmiec ............... | 267/274 X |
| 5,641,175 A | * 6/1997 | Maeda et al. ...... | 267/273 |
| 5,687,960 A | 11/1997 | Moon ................ | 267/273 |

* cited by examiner

Primary Examiner—Paul N. Dickson
Assistant Examiner—Toan To
(74) Attorney, Agent, or Firm—Carlson Gaskey & Olds

(57) ABSTRACT

A suspension system includes a torsion bar having at least one adjuster arm. The adjuster arms extend radially from the torsion bar to contact respective stop members when the torsion bar is subjected to a predetermined torsion. When an adjuster arm contacts a stop, a portion of the torsion bar is rotationally fixed and the effective length of the torsion bar is reduced. By reducing the effective length of the torsion bar, the effective spring, rate of the torsion bar is increased. The present invention therefore provides a suspension system for a vehicle which can enhance riding comfort and handling by modifying the effective length of the torsion bar to achieve multiple spring constants with a single constant diameter torsion bar.

10 Claims, 1 Drawing Sheet

TORSION BAR WITH MULTIPLE ARM ADJUSTERS FOR A VEHICLE SUSPENSION SYSTEM

BACKGROUND OF THE INVENTION

The present invention relates to a torsion bar assembly for a vehicle suspension system, and more particularly to modifying the effective length of the torsion bar to provide variable effective spring rates.

Vehicles are commonly equipped with independent suspension systems which can include a vibration or shock absorbing device for absorbing road shock and other vibrations while providing a smooth and comfortable ride for the vehicle occupants. One type of shock absorbing system includes a torsion bar. In suspension systems of this type, the torsion bar extends longitudinally along the length of the vehicle. One end of the torsion bar is connected to a suspension control arm while the other end is fixed to the vehicle frame. The torsion bar twists according to the articulation of the suspension component to provide a torsional elastic resistance to the up/down or jounce/rebound movement of the suspension component. The torsion bar thereby acts as a spring to absorb vibrations from the road surface and provide particular handling qualities.

As noted, one end of the torsion bar is attached to the vehicle frame. It is known to provide an adjuster arm to connect the end of the torsion bar to the frame. The adjuster arm allows the torsion bar to be preloaded or twisted to provide a particular spring rate of the torsion bar and thereby tune the suspension characteristics. However, such conventional torsion bar systems are limited to the predefined constant spring rate.

It is also known to provide a multi-segment torsion bar. Each segment has a different diameter to provide different spring rigidities. A catching protrusion is located at the boundary between each segment. When the torsion bar is subjected to small scale vibrations, the small diameter segment twists and absorbs the vibration. When vibration generate twisting of the torsion bar in excess of the catching protrusion, the small diameter segment becomes rotationally fixed and the relatively larger diameter segment twists to absorb the vibration. However, such a multi-segmented torsion bar is difficult to manufacture as each segment must be securely attached to the other segments to resist the torsional loads. Further, the multi-segment torsion bar is predefined during manufacture to provide particular spring rates based on the diameter and length of the connected segments. This limits the adaptability of the torsion bar and necessarily prevents later fine tuning of the suspension system as the segments are fixed.

Accordingly, it is desirable to provide a torsion bar suspension, which is relatively uncomplicated to manufacture, and which can provide variable spring rates in a multiple of vehicle applications. It is also desirable to provide a torsion bar suspension which can be fine-tuned after installation in a vehicle.

SUMMARY OF THE INVENTION

The suspension system according to the present invention includes a one-piece torsion bar having at least one adjuster arm. The adjuster arms are mountable along the length of the torsion bar to contact respective stop members. The adjuster arms contact the stop members when the torsion bar is subjected to a predetermined torsion. That is, the entire torsion bar can be twisted until the predetermined torsion is reached and a first adjuster arm contacts a first stop. When the first adjuster arm contacts the first stop, a portion of the torsion bar is rotationally fixed and the effective length of the torsion bar is reduced. By reducing the effective length of the torsion bar, the effective spring rate of the torsion bar is increased. Further, by axially shifting the adjuster arms after installation in the vehicle, the spring rates of the torsion bar and thus the suspension system can be fine-tuned.

According to the present invention, relatively small vibrations, such as that which occur during a normal straight travelling condition, are absorbable by the entire torsion bar. Because the entire length of the torsion bar is the effective length, a relatively soft spring constant absorbs the vibrations and provides a smooth ride. However, as impact or additional loads are applied to the torsion bar, the effective length of the torsion bar is reduced and the suspension is stiffened.

The present invention therefore provides a suspension system for a vehicle which can enhance riding comfort and handling by modifying the effective length of the torsion bar to achieve multiple spring constants with a single constant diameter torsion bar.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
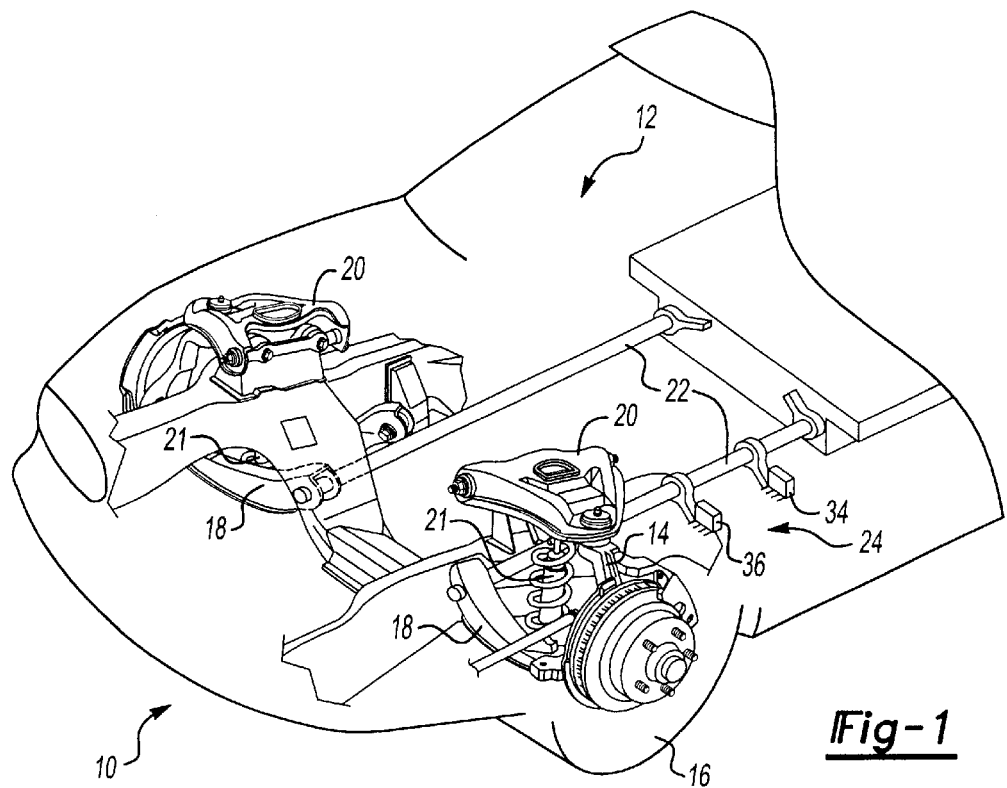
FIG. 1 is a general phantom view of a vehicle suspension system according to the present invention.
Figure 2:
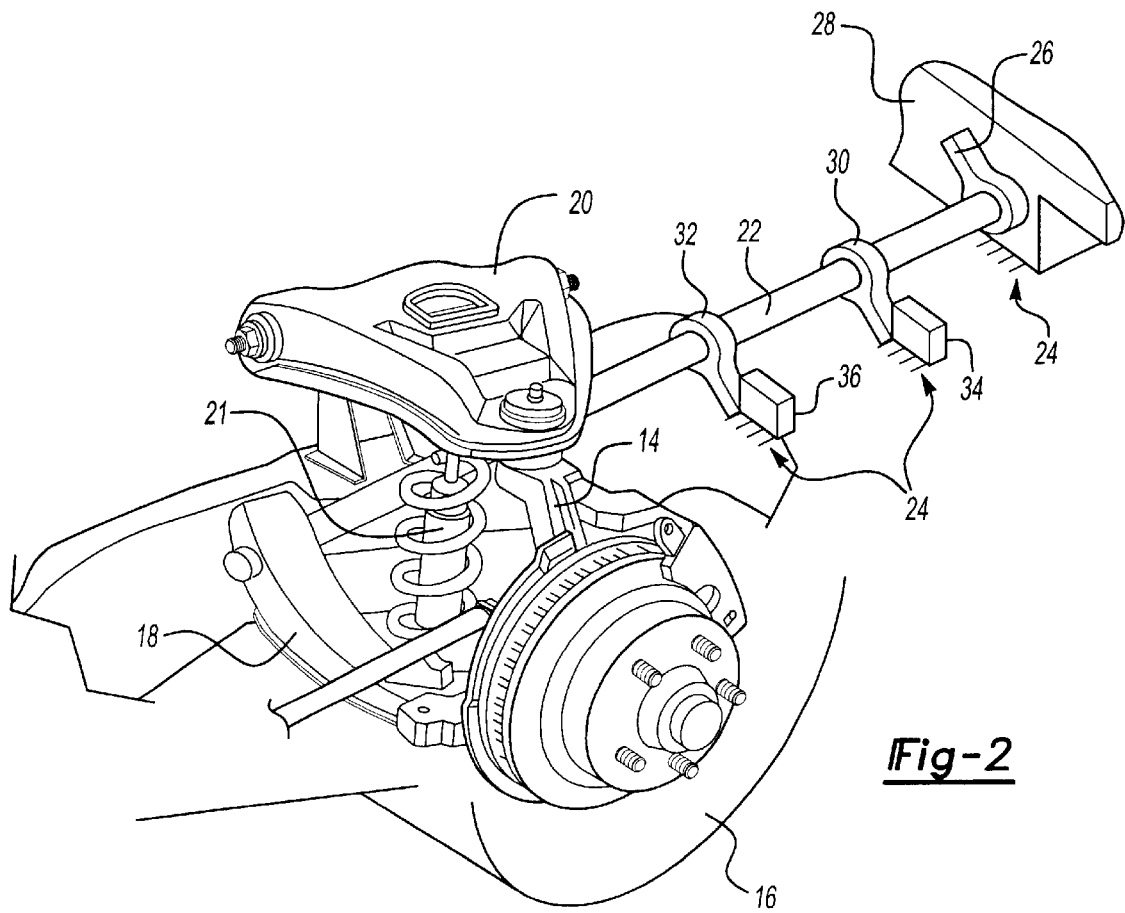
FIG. 2 is an expanded view facing forwardly along a torsion bar according to the present invention.

FIG. 1 schematically illustrates a suspension system 10 for a vehicle 12. The system 10 generally includes an axle 14 that supports a wheel 16. The axle 14 can be articulated in an up/down direction via a lower suspension link 18 and an upper suspension link 20. As can be seen in FIG. 2, a torsion bar 22 is connected to the lower link 18 at one end and to the vehicle frame 24 by an anchor arm 26 at the other. To dampen the movement of the lower suspension link 18, a shock absorber 21 is typically connected between the lower link 18 and the vehicle frame 24. In operation, the torsion bar 22 twists in response to the articulation of the lower link 18 due to the up/down movement of the axle 14 and wheel 16. In this way, the torsion bar 22 provides elastic resistance to the up/down articulation of the lower link 18.

Referring to FIG. 2, one end of the torsion bar 22 is fixed to the lower link 18, and the other end is joined to a cross member 28 of the vehicle frame 24 by the anchor arm 26. The twist angle of the torsion bar 22, i.e. an initial load, is adjusted by varying the position of the anchor arm 26 relative to the cross member 28.

In the disclosed embodiment, the torsion bar 22 also supports a first adjuster arm 30 and a second adjuster arm 32. The first 30 and second 32 adjuster arms are mountable along the length of the torsion bar 22 to contact a first and second stop member 34, 36. The stop members 30, 32 can be separate components attachable to the vehicle frame 24 or be integral parts of the vehicle frame 24 itself.

The adjuster arms 30, 32 extend radially from the torsion bar 22 to respectively contact the stop member 34, 36 when the torsion bar 22 is subjected to a predetermined torsion or twist. That is, the entire torsion bar 22 can be rotated or twisted until a predetermined torsion is reached and the first adjuster arm 30 contacts the first stop 34. When the first adjuster arm 30 contacts the first stop 34, a length of the torsion bar 22 from the cross member 28 to the first adjuster arm 30 is thereby rotationally fixed. The effective length of the torsion bar 22 is thereby reduced to the length from the first adjuster arm 30 to the lower link 18. By reducing the effective length of the torsion bar 22, the effective spring rate of the torsion bar 22 is increased.

When the torsion bar 22 is subjected to further torsional loads such that a second predetermined torsion is achieved, the second adjuster arm 32 contacts the second stop 36. Now, a second length of the torsion bar 22 defined from the cross member 28 to the second adjuster arm 32 is rotationally fixed. The effective length of the torsion bar 22 is now reduced to the length from the from the second adjuster arm 32 to the lower link 18. Accordingly, because only the length from the second adjuster arm 32 to the lower link 18 can be rotated or twisted, the effective spring rate of the torsion bar 22 is further increased.

According to the disclosed embodiment, relatively small impacts, such as that which occur during a normal straight travelling condition, are absorbable by the entire torsion bar 22 because the first adjuster arm 30 is not in contact with the first stop 34. Because the entire length of the torsion bar is the effective length, the torsion bar provides a relatively soft spring constant. The torsion bar 22 absorbs the vibrations and provides a smooth ride. However, when a predetermined load is applied to the torsion bar, the adjuster arm contacts the stop. The effective length of the torsion bar is reduced and the suspension is accordingly stiffened. The stiffer suspension is thus provided when it is required, such as when cornering, while allowing a smooth ride when it is not required, such as during normal straight travelling.

Preferably, the torsion bar 22 is manufactured as a single one-piece bar of a having a constant diameter and the adjuster arms are positioned along the torsion bar to provide the desired spring rates in response to predetermined torsional loads. It will be realized by one skilled in the art, that the number, radial position, and axial position of adjuster arms can be varied to provide desired spring rates and handling characteristics according to the teachings of the present invention.

As described above, the present invention provides a suspension system for a vehicle which can enhance riding comfort and handling by modifying the effective length of the torsion bar to achieve multiple spring constants with a single constant diameter torsion bar. Further, by axially shifting the adjuster arms after installation in the vehicle, the suspension system can be fine tuned.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A suspension system for a vehicle comprising;
   a suspension member;
   a torsion bar having a uniform cross-sectional area, said torsion bar having a first segment attached to said suspension member and a second segment attached to a vehicle frame member, said torsion bar operable to provide an elastic resistance to said suspension member, said elastic resistance dependant on an effective length of said torsion bar;
   a first stop mounted to the vehicle frame;
   a first adjuster arm fixed to said torsion bar intermediate said vehicle frame member and said suspension member, said first adjuster arm selectively engaged with said stop to reduce said effective length of said torsion bar when said torsion bar is subjected to a first predetermined torsional force; and
   fixed to said torsion bar selectively engaged with a second stop.

2. The suspension system as recited in claim 1, wherein said torsion bar is a single continuous member.

3. The suspension system as recited in claim 1, wherein said stop is the vehicle frame.

4. The suspension system as recited in claim 1, wherein said first segment of said torsion bar includes a first end of said torsion bar and said second segment of said torsion bar includes an opposite end of said torsion bar.

5. A suspension system for a vehicle comprising;
   a suspension member;
   a torsion bar having a uniform cross-sectional area, said torsion bar having a first segment attached to said suspension member and a second segment attached to a vehicle frame member, said torsion bar operable to provide an elastic resistance to said suspension member, said elastic resistance dependant on an effective length of said torsion bar;
   a first and a second stops mounted to the vehicle frame; and
   a first and a second adjuster arms fixed to said torsion bar intermediate said vehicle frame member and said suspension member, said first and said second adjuster arms respectively selectively engaged with said first and said second stops to reduce said effective length of said torsion bar when said torsion bar is subjected to a predetermined torsional force.

6. The suspension system as recited in claim 5, wherein said torsion bar is a single continuous member.

7. The suspension system as recited in claim 5, wherein said torsion bar has uniform cross-sectional area.

8. The suspension system as recited in claim 5, wherein said first segment of said torsion bar includes a first end of said torsion bar and said second segment of said torsion bar includes an opposite end of said torsion bar.

9. The suspension system as recited in claim 5, wherein said first adjuster arm is rotationally offset relative said second adjuster arm such that said first adjuster arm contacts said first stop prior to contact between said second adjuster arm and said second stop.

10. The suspension system as recited in claim 5, wherein said first and second adjuster arm arc axial offset along said torsion bar.

* * * * *

UNITED STATES PATENT AND TRADEMARK OFFICE
CERTIFICATE OF CORRECTION

PATENT NO.    : 6,425,594 B1
DATED         : July 30, 2002
INVENTOR(S)   : Fader et al.

It is certified that error appears in the above-identified patent and that said Letters Patent is hereby corrected as shown below:

<u>Column 4,</u>
Line 9, "dependant" should be -- dependent --
Lines 18 and 19, should read as follows -- a second adjuster arm fixed to said torsion bar intermediate said vehicle frame member, wherein, the second adjuster arm selectively engages with a second stop --

Signed and Sealed this

Fifth Day of November, 2002

*Attest:*

JAMES E. ROGAN
*Attesting Officer*   *Director of the United States Patent and Trademark Office*